(12) United States Patent
Yu et al.

(10) Patent No.: US 11,365,767 B2
(45) Date of Patent: Jun. 21, 2022

(54) CLUTCH AND AUTOMOBILE HAVING THE SAME

(71) Applicant: ZHEJIANG SIEKON TRANSMISSION TECHNOLOGY CO., LTD, Jiaxing (CN)

(72) Inventors: Wenyong Yu, Taizhou (CN); Akihiro Nakao, Taizhou (CN); Jianhua Jin, Taizhou (CN)

(73) Assignee: ZHEJIANG SIEKON TRANSMISSION TECHNOLOGY CO., LTD, Jiaxing (CN)

( * ) Notice: Subject to any disclaimer, the term of this patent is extended or adjusted under 35 U.S.C. 154(b) by 358 days.

(21) Appl. No.: 16/474,359

(22) PCT Filed: Dec. 25, 2018

(86) PCT No.: PCT/CN2018/123422
§ 371 (c)(1),
(2) Date: Jun. 27, 2019

(87) PCT Pub. No.: WO2020/034540
PCT Pub. Date: Feb. 20, 2020

(65) Prior Publication Data
US 2021/0332860 A1    Oct. 28, 2021

(30) Foreign Application Priority Data
Aug. 13, 2018   (CN) .......................... 201810915737.4

(51) Int. Cl.
*F16D 13/52* (2006.01)
*F16D 13/56* (2006.01)
(Continued)

(52) U.S. Cl.
CPC ............. *F16D 13/52* (2013.01); *F16D 13/56* (2013.01); *F16D 13/71* (2013.01); *F16D 23/02* (2013.01); *F16D 25/0638* (2013.01)

(58) Field of Classification Search
CPC ............................. F16D 13/52; F16D 25/0638
See application file for complete search history.

(56) References Cited

U.S. PATENT DOCUMENTS 968,308 A  *  8/1910  Yocom .................. F16D 13/385
                                                 192/70.21
1,953,187 A  *  4/1934  Nakashian .............. F16D 13/52
                                                 192/52.2
(Continued)

FOREIGN PATENT DOCUMENTS

CN        201180747 Y      1/2009
CN        102661330 A      9/2012
(Continued)

OTHER PUBLICATIONS

International Search Report issued by the State Intellectual Property Office acting as the International Searching Authority in relation to International Application No. PCT/CN2018/123422 dated Apr. 30, 2019 (6 pages).

(Continued)

*Primary Examiner* — David R Morris
(74) *Attorney, Agent, or Firm* — Maier & Maier, PLLC

(57) ABSTRACT

A clutch includes a drive disc, a driven disc, and a friction plate unit capable of engaging or disengaging the drive disc with or from the driven disc, the friction plate unit including a first friction plate assembly and a second friction plate assembly, the clutch further including a pressing unit configured to engage or disengage the drive disc with or from the driven disc selectively by the first friction plate assembly alone or by a combination of the first friction plate assembly and the second friction plate assembly. Such an arrangement (Continued)

enables the clutch to select an appropriate number of friction plates as required for engagement, solving the problem that in existing multi-plate clutches, it is impossible to select an appropriate number of friction plates to participate in work to make the clutches obtain optimal performance according to different working conditions of the automobile.

8 Claims, 7 Drawing Sheets

(51) Int. Cl.
*F16D 13/71* (2006.01)
*F16D 23/02* (2006.01)
*F16D 25/0638* (2006.01)

(56) References Cited

U.S. PATENT DOCUMENTS

| | | | | |
|---|---|---|---|---|
| 4,437,555 | A * | 3/1984 | Tomm | F16D 13/757 192/111.16 |
| 4,724,941 | A * | 2/1988 | Wirkner | F16D 25/0638 192/109 F |
| 6,227,340 | B1 * | 5/2001 | Braford, Jr. | F16D 21/06 192/48.7 |
| 6,702,081 | B2 * | 3/2004 | Gorman | F16D 25/0638 192/109 R |
| 2016/0201734 | A1 | 7/2016 | Berndt | |

FOREIGN PATENT DOCUMENTS

| | | |
|---|---|---|
| CN | 203548621 U | 4/2014 |
| CN | 204226623 U | 3/2015 |
| CN | 106104054 A | 11/2016 |
| CN | 108825675 A | 11/2018 |
| JP | 2016008627 A | 1/2016 |

OTHER PUBLICATIONS

Written Opinion of the International Searching Authority issued by the State Intellectual Property Office acting as the International Searching Authority in relation to International Application No. PCT/CN2018/123422 dated Apr. 30, 2019 (5 pages).

* cited by examiner

CLUTCH AND AUTOMOBILE HAVING THE SAME

CROSS-REFERENCE TO RELATED APPLICATIONS

This application is a national phase entry under 35 U.S.C. 371 of PCT International Application No. PCT/CN2018/123422 filed Dec. 25, 2018, which claims priority to Chinese Patent Application No. 201810915737.4 filed Aug. 13, 2018, the disclosure of each of these applications is expressly incorporated herein by reference in their entirety.

TECHNICAL FIELD

The present disclosure relates to the technical field of clutch, and in particular provides a clutch and an automobile having the same.

BACKGROUND

A clutch is a component used for power engagement and disengagement in an automobile. With the development of the automotive industry and the increasing demands on the driving smoothness of automobiles, smooth power transmission is required in the gear shifting process of the transmission to ensure a smooth start of the automobile and reduce the impact in gear shifting.

Multi-plate clutches have been widely used due to their advantages of small size, large transmission torque and the like. However, in the process of power engagement performed by multi-plate clutches currently in use, all the friction plates need to participate in torque transmission no matter whether a large torque or a small torque is to be transmitted. In this way, all the friction plates of the clutch are involved under different driving conditions of the automobile, and it is impossible to make adjustment according to different conditions of the automobile to obtain the optimal performance of the clutch.

Accordingly, there is need for a new solution in the art to address the above problem.

SUMMARY

In order to address the above problem in the related art, that is, in order to address the problem that in existing multi-plate clutches, it is impossible to select an appropriate number of friction plates to participate in work to make the clutches obtain optimal performance according to different working conditions of the automobile, the present disclosure provides a clutch, which includes a drive disc, a driven disc, and a friction plate unit capable of engaging or disengaging the drive disc with or from the driven disc, the friction plate unit including a first friction plate assembly and a second friction plate assembly, the clutch further including a pressing unit configured to engage or disengage the drive disc with or from the driven disc selectively by the first friction plate assembly alone or by a combination of the first friction plate assembly and the second friction plate assembly.

In a preferred technical solution of the clutch described above, the first friction plate assembly includes at least one pair of first outer friction plate and first inner friction plate that are capable of abutting with each other, wherein the first outer friction plate is rotatable in synchronization with the drive disc, and the first inner friction plate is rotatable in synchronization with the driven disc.

In a preferred technical solution of the clutch described above, the first friction plate assembly includes at least one pair of first outer friction plate and first inner friction plate that are capable of abutting with each other, wherein the first outer friction plate is rotatable in synchronization with the driven disc, and the first inner friction plate is rotatable in synchronization with the drive disc.

In a preferred technical solution of the clutch described above, the second friction plate assembly includes a basic outer friction plate that can abut with a first inner friction plate of the first friction plate assembly that is adjacent to the side of the second friction plate assembly, the basic outer friction plate being rotatable in synchronization with the driven disc.

In a preferred technical solution of the clutch described above, the clutch includes a bushing fixedly connected or integrally formed with the drive disc, and the pressing unit includes an outer hub movable in an axial direction of the bushing and synchronously rotatable with the bushing, and a spring assembly provided on the outer hub, wherein the outer hub is movable in a direction toward the first friction plate assembly in the axial direction of the bushing to engage the first outer friction plate with the first inner friction plate of the first friction plate assembly by pressing the spring assembly; and based on the engagement of the first outer friction plate with the first inner friction plate of the first friction plate assembly, the outer hub can continue to move in a direction toward the first friction plate assembly in the axial direction of the bushing to engage the basic outer friction plate of the second friction plate assembly with the first friction plate assembly by pressing the spring assembly.

In a preferred technical solution of the clutch described above, the spring assembly includes pre-compressed first spring and second spring, wherein the outer hub includes a flange portion and a boss portion, the first spring is disposed between the boss portion and the drive disc, the first inner friction plate is sleeved over the boss portion, the boss portion is provided with a stop structure disposed on a side of the first inner friction plate closely adjacent to the basic friction plate that is opposite to the basic friction plate, and the second spring is disposed between the flange portion and the first inner friction plate closely adjacent to the basic friction plate to abut the first inner friction plate closely adjacent to the basic friction plate against the stop structure, and wherein the first spring is further compressed as the outer hub moves closer to the first friction plate assembly to engage the first outer friction plate with the first inner friction plate, and a pre-tightening force of the second spring is greater than a pressing force required for engaging the first outer friction plate with the first inner friction plate of the first friction plate assembly, so that based on the engagement of the first outer friction plate and the second inner friction plate, the second spring is further compressed when the outer hub continues to move closer to the first friction plate assembly to cause the flange portion to press the basic friction plate to thereby engage the basic outer friction plate with the first inner friction plate closely adjacent to the basic friction plate.

In a preferred technical solution of the clutch described above, the second friction plate assembly further includes at least one pair of second outer friction plate and second inner friction plate that can abut with each other between the basic outer friction plate and the pressing unit, the second outer friction plate being rotatable in synchronization with the driven disc, and the second inner friction plate being rotatable in synchronization with the drive disc.

In a preferred technical solution of the clutch described above, the clutch includes a bushing fixedly connected or integrally formed with the drive disc, and the pressing unit includes an outer hub movable in an axial direction of the bushing and synchronously rotatable with the bushing, and a spring assembly provided on the outer hub, wherein the outer hub is movable in a direction toward the first friction plate assembly in the axial direction of the bushing to engage the first outer friction plate with the first inner friction plate of the first friction plate assembly by pressing the spring assembly; and based on the engagement of the first outer friction plate with the first inner friction plate of the first friction plate assembly, the outer hub can continue to move in a direction toward the first friction plate assembly in the axial direction of the bushing to engage the basic outer friction plate of the second friction plate assembly with the first friction plate assembly by pressing the spring assembly.

In a preferred technical solution of the clutch described above, the spring assembly includes pre-compressed first spring and second spring, wherein the outer hub includes a flange portion and a boss portion, the first spring is disposed between the boss portion and the drive disc, the first inner friction plate is sleeved over the boss portion, and the boss portion is provided with a stop structure disposed on a side of the first inner friction plate closely adjacent to the basic friction plate that is opposite to the basic friction plate, the second spring is disposed between the flange portion and the first inner friction plate closely adjacent to the basic friction plate to abut the first inner friction plate closely adjacent to the basic friction plate against the stop structure, and wherein the first spring is further compressed as the outer hub moves closer to the first friction plate assembly to engage the first outer friction plate with the first inner friction plate, and a pre-tightening force of the second spring is greater than a pressing force required for engaging the first outer friction plate with the first inner friction plate of the first friction plate assembly, so that based on the engagement of the first outer friction plate and the second inner friction plate, the second spring is further compressed when the outer hub continues to move closer to the first friction plate assembly to cause the flange portion to press the second friction plate assembly to thereby engage the basic outer friction plate with the first inner friction plate closely adjacent to the basic friction plate.

In a preferred technical solution of the clutch described above, the spring assembly includes a plurality of first springs and a plurality of second springs, the plurality of first springs and the plurality of second springs each being disposed in a circumferential direction of the outer hub.

In a preferred technical solution of the clutch described above, the pressing unit further includes an inner hub connected to the bushing, and a docking structure is provided between the inner hub and the outer hub, the docking structure including a plurality of bosses provided on an outer surface of the inner hub and a plurality of grooves provided on an inner surface of the outer hub for fitting with the bosses.

In a preferred technical solution of the clutch described above, each of the bosses expands from a side adjacent to the second friction plate assembly to the other side in an axial direction of the bushing.

Furthermore, the present disclosure provides an automobile including the clutch according to any one of the above-described preferred technical solutions of the clutch.

It can be understood by those skilled in the art that, in the technical solutions of the present disclosure, the clutch includes a drive disc, a driven disc, and a friction plate unit capable of engaging or disengaging the drive disc with or from the driven disc, wherein the friction plate unit includes a first friction plate assembly and a second friction plate assembly, the clutch further includes a pressing unit configured to engage or disengage the drive disc with or from the driven disc selectively by the first friction plate assembly alone or by a combination of the first friction plate assembly and the second friction plate assembly. With such an arrangement, when there is a need to transmit a small torque, it is only required to engage the drive disc with the driven disc by the first friction plate assembly, and when there is a need to transmit a large torque, the drive disc is engaged with the driven disc by the combination of the first friction plate assembly and the second friction plate assembly, which can achieve transmission of a large torque, thus not only satisfying the requirement of torque transmission, but also enabling an appropriate number of friction plates to be selected to participate in work so that an optimal working state is realized for the clutch, solving the problem that in existing multi-plate clutches, it is impossible to select an appropriate number of friction plates to participate in work to make the clutches obtain optimal performance according to different working conditions of the automobile.

In a preferred technical solution of the clutch described above, the clutch includes a bushing fixedly connected or integrally formed with the drive disc, and the pressing unit includes an outer hub movable in an axial direction of the bushing and synchronously rotatable with the bushing, and a spring assembly disposed on the outer hub; the first friction plate assembly includes at least one pair of first outer friction plate and first inner friction plate that are capable of abutting each other, wherein the first outer friction plate is rotatable in synchronization with the driven disc, and the first inner friction plate is rotatable in synchronization with the drive disc; the second friction plate assembly includes a basic outer friction plate that can abut with a first inner friction plate of the first friction plate assembly that is adjacent to the side of the second friction plate assembly, and the basic outer friction plate is rotatable synchronously with the driven plate; wherein the outer hub is movable in a direction toward the first friction plate assembly in the axial direction of the bushing to engage the first outer friction plate with the first inner friction plate of the first friction plate assembly by pressing the spring assembly; and based on the engagement of the first outer friction plate with the first inner friction plate of the first friction plate assembly, the outer hub can continue to move in a direction toward the first friction plate assembly in the axial direction of the bushing to engage the basic outer friction plate of the second friction plate assembly with the first friction plate assembly by pressing the spring assembly.

BRIEF DESCRIPTION OF THE DRAWINGS

Preferred embodiments of the present disclosure will be described below with reference to the accompanying drawings in connection with a wet clutch, in which.

Figure 1:
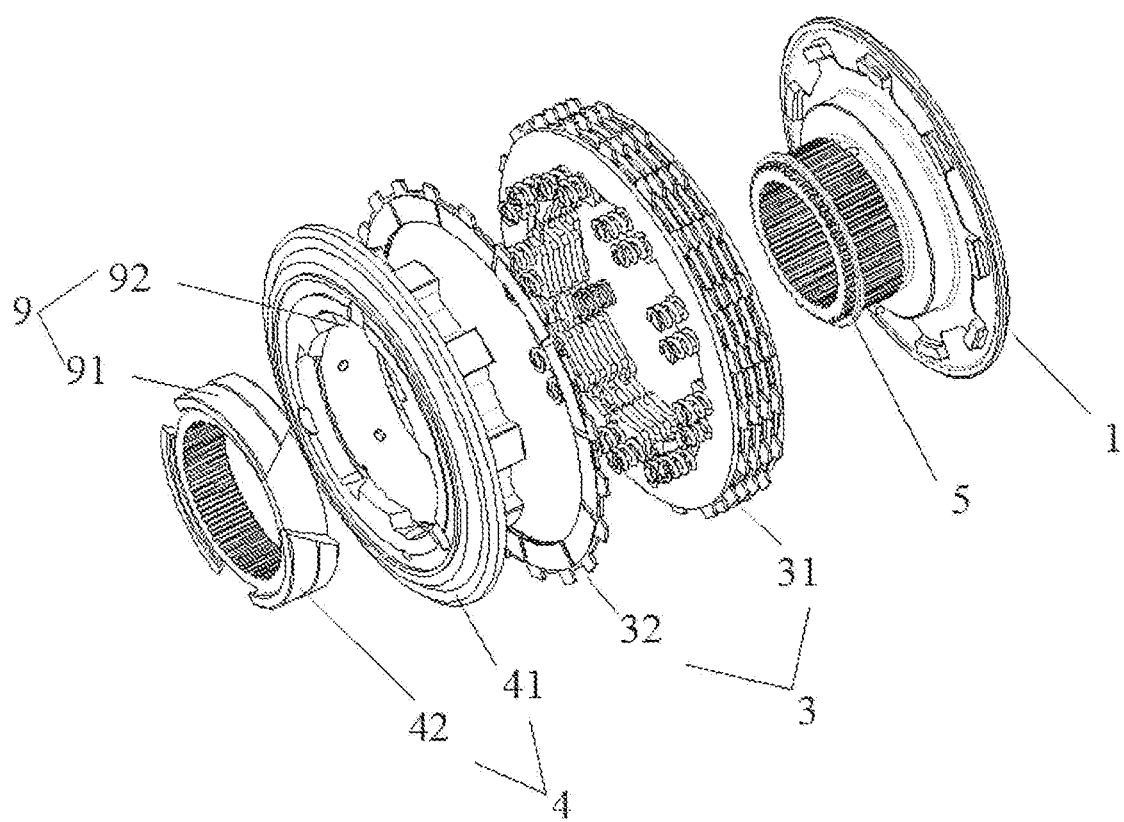
FIG. 1 is a schematic exploded view of a wet clutch according to an embodiment of the present disclosure.

LIST OF REFERENCE SIGNS 1. drive disc; 2. driven disc; 3. friction plate unit; 31. first friction plate assembly; 311. first inner friction plate; 312. first outer friction plate; 32. second friction plate assembly; 321. basic outer friction plate; 4. pressing unit; 41. outer hub; 411. first mounting position; 412. second mounting position; 42. inner hub; 5. bushing; 6. pressing bearing; 7. spring assembly; 71. first spring; 72. second spring; 8. stop structure; 9. docking structure; 91. boss; 92. groove.

DETAILED DESCRIPTION OF THE EMBODIMENTS

It should be understood by those skilled in the art that the embodiments in this section are merely used to explain the technical principles of the present disclosure, rather than limiting the scope of protection of the present disclosure. For example, although the present disclosure is described in connection with a wet clutch, those skilled in the art can make adjustment as needed for adaption to specific application scenes. For example, the clutch can also be a dry clutch. Obviously, the adjusted technical solution will still fall within the scope of protection of the present disclosure.

It should be noted that in the description of the present disclosure, the terms "upper", "lower", "left", "right" and the like that indicate directional or positional relationship are based on the directional or positional relationship shown in the drawings, which, merely for convenience of description, do not indicate or imply that the device or element involved must have the specific orientation or be configured and operated in the specific orientation. Therefore, they shall not be construed as limiting the present disclosure. Moreover, the terms "first" and "second" are used for descriptive purposes only and shall not be construed as indicating or implying their relative importance.

In addition, it should be noted that in the description of the present disclosure, the terms "fix", "provide", and "connect" should be construed in a broad sense, unless explicitly specified or defined otherwise. For example, the connection may be fixed connection or detachable connection, may be mechanical connection or electrical connection, and may be direct connection or indirect connection via an intermediate medium. For those skilled in the art, the specific meanings of the above terms in the present disclosure can be understood on a case-by-case basis.

Figure 4:
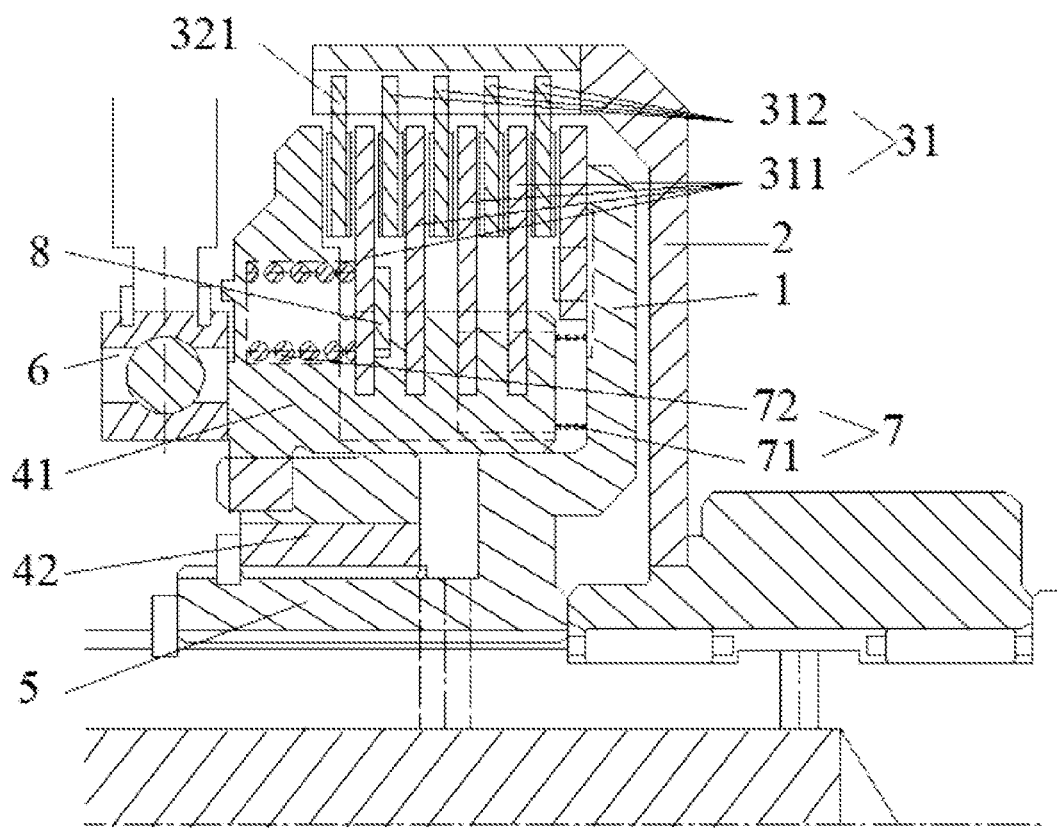
FIG. 4 is a schematic state view of a wet clutch according to an embodiment of the present disclosure in a non-engaged state.

Referring to FIGS. 1 and 4, FIG. 1 is a schematic exploded view of a wet clutch according to an embodiment of the present disclosure, and FIG. 4 is a schematic state view of a wet clutch according to an embodiment of the present disclosure in a non-engaged state.

As shown in FIGS. 1 and 4, the wet clutch mainly includes a drive disc 1, a driven disc 2, and a friction plate unit 3 capable of engaging or disengaging the drive disc 1 with or from the driven disc 2, and the friction plate unit 3 includes a first friction plate assembly 31 and a second friction plate assembly 32. The wet clutch further includes a pressing unit 4 capable of engaging or disengaging the drive disc 1 with or from the driven disc 2 by the first friction plate assembly 31 alone, and the pressing unit 4 can also engage or disengage the drive disc 1 with or from the driven disc 2 by a combination of the first friction plate assembly 31 and the second friction plate assembly 32.

With such an arrangement, in the case where there is a need to transmit a small torque, it is only required to engage the drive disc 1 with the driven disc 2 by the first friction plate assembly 31, which not only satisfies the torque transmission but also reduces the number of friction plates causing friction losses, solving the problem that in existing multi-plate clutches, it is impossible to select an appropriate number of friction plates to participate in work to make the clutches obtain optimal performance according to different working conditions of the automobile. In the case where there is a need to transmit a large torque, the drive disc 1 and the driven disc 2 are engaged by the combination of the first friction plate assembly 31 and the second friction plate assembly 32, which can achieve transmission of a large torque.

Figure 2:
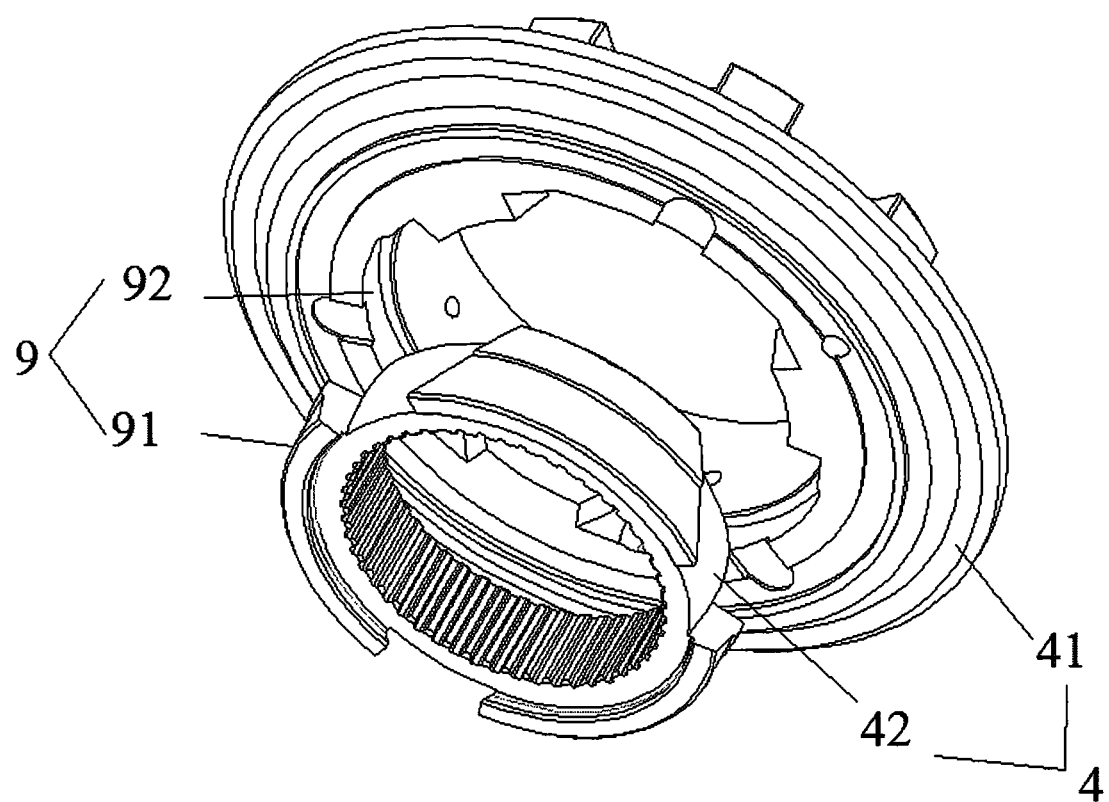
FIG. 2 is a schematic structural view of a pressing unit of a wet clutch according to an embodiment of the present disclosure.
Figure 3:
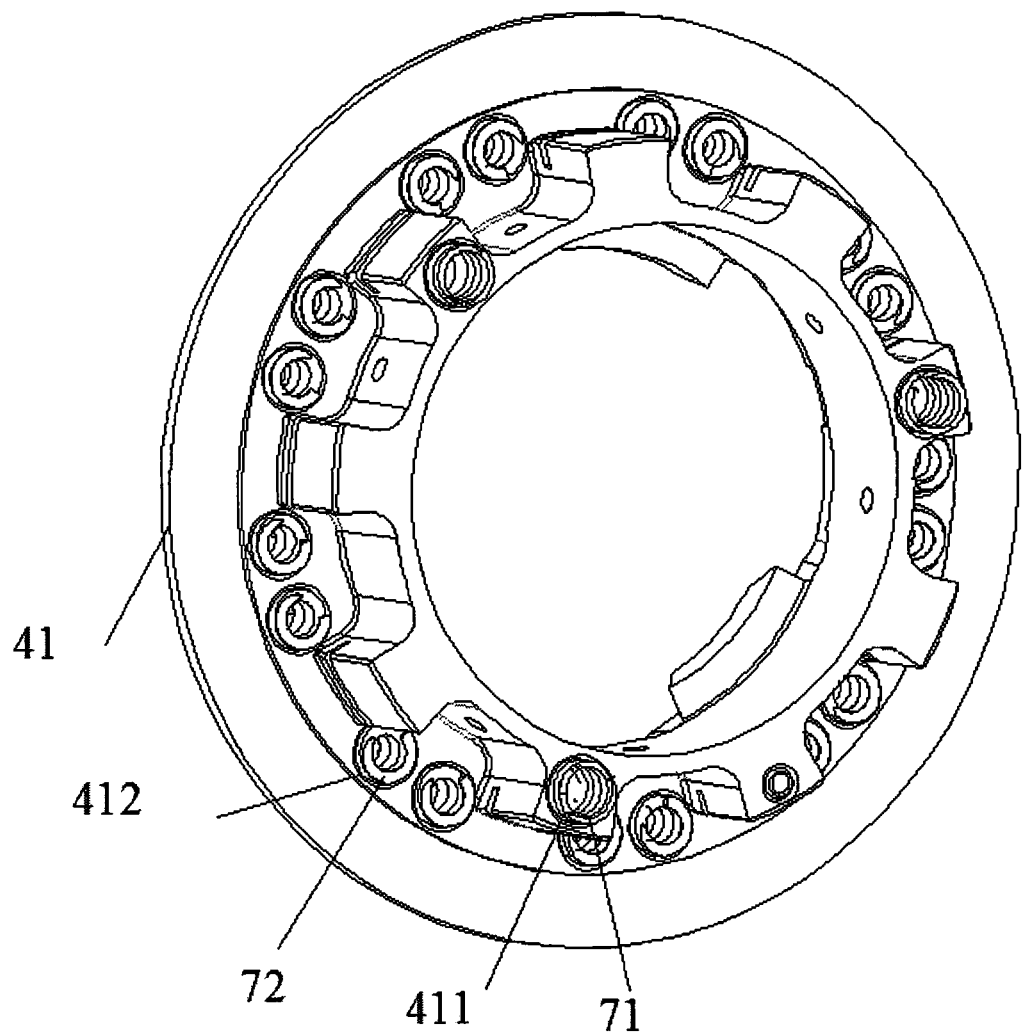
FIG. 3 is a schematic structural view of an outer hub of a wet clutch according to an embodiment of the present disclosure.

Referring to FIGS. 2 and 3 and still referring to FIGS. 1 and 4, FIG. 2 is a schematic structural view of a pressing unit of a wet clutch according to an embodiment of the present disclosure, and FIG. 3 is a schematic structural view of an outer hub of a wet clutch according to an embodiment of the present disclosure.

As shown in FIGS. 1-4, specifically, the clutch includes a bushing 5 for connection with an input shaft, and the drive disc 1 is formed integrally with the bushing 5. The driven disc 2 is disposed on the right side of the drive disc 1 and is fixedly connected to an output shaft. The pressing unit 4 is connected to the bushing 5 by splines for synchronous rotation therewith, and a friction plate unit 3 is provided between the pressing unit 4 and the drive disc 1. The friction plate unit 3 includes a second friction plate assembly 32 on the left side and a first friction plate assembly 31 on the right side. The first friction plate assembly 31 includes four pairs of first inner friction plate 311 and first outer friction plate 312 that can abut with each other. The second friction plate assembly 32 includes a basic outer friction plate 321 that can abut with a first inner friction plate 311 of the first friction plate assembly 31 that is close to the side of the second friction plate assembly 32 (that is, the left side of the second friction plate assembly 32). The first outer friction plates 312 and the basic outer friction plate 321 are both connected to the driven disc 2 in a meshing manner so as to be rotatable synchronously with the driven disc 2 and movable in an axial direction relative to the driven disc 2. The first inner friction plates 311 are connected to the drive disc 1 in a meshing manner so as to be rotatable in synchronization with the drive disc 1 and movable in the axial direction relative to the drive disc 1.

The pressing unit 4 includes an outer hub 41 movable in the axial direction of the bushing 5 and rotatable in synchronization with the bushing 5. On the left side of the outer hub 41, a pressing bearing 6 is provided. A spring assembly 7 is provided on the outer hub 41. The spring assembly 7 includes pre-compressed first spring 71 and second spring 72. A pre-tightening force of the second spring 72 is greater than a pressing force required for engaging the first outer friction plate 312 with the first inner friction plate 311 of the first friction plate assembly 31. The outer hub 41 includes a flange portion and a boss portion extending rightwards on the flange portion. The boss portion is of a cylindrical structure, and an outer surface of the boss portion is circumferentially distributed with a plurality of grooves extending axially. An inner ring of the first inner friction plate 311 is circumferentially formed with a plurality of tabs matching with the grooves on the outer surface of the boss portion. The plurality of tabs on the first inner friction plate 311 are fitted with the plurality of grooves on the outer surface of the boss portion of the outer hub 41 such that the first inner friction plate 311 can maintain synchronous rotation with the outer hub 41 and move axially relative to the outer hub 41, while the outer hub 41 is movable in the axial direction of the bushing 5 and synchronously rotatable with the bushing 5 such that the first inner plate 311 can maintain synchronous rotation with the drive disc 1 and move axially relative to the drive disc 1. The driven disc 2 includes a disc body and a cylindrical flange extending axially on an outer edge of the disc body. An inner surface of the cylindrical flange of the driven disc 2 is circumferentially formed with a plurality of grooves extending in the axial direction. Outer rings of the first outer friction plates 312 and the basic outer friction plate 321 are circumferentially formed with a plurality of tabs matching with the plurality of grooves on the inner surface of the cylindrical flange of the driven disc 2. The plurality of tabs of the first outer friction plates 312 and the basic outer friction plate 321 are fitted with the plurality of grooves on the inner surface of the cylindrical flange of the driven disc 2 so that the first outer friction plates 312 and the basic outer friction plate 321 can maintain synchronous rotation with the driven disc 2 and move axially relative to the driven disc 2.

Three first mounting positions 411 are evenly provided on the boss portion of the outer hub 41 in a circumferential direction of the outer hub 41, and eighteen second mounting positions 412 are evenly provided on the flange portion of the outer hub 41 in the circumferential direction of the outer hub 41. Three first springs 71 are mounted to the first mounting positions 411, and eighteen second springs 72 are mounted to the second mounting positions 412. In addition, the outer hub 41 is also provided with a stop structure 8. In an assembled state, left and right ends of the first spring 71 abut against the outer hub 41 and the drive disc 1 respectively, and left and right ends of the second spring 72 respectively abut against the outer hub 41 and the leftmost first inner friction plate 311 of the first friction plate assembly 31, so that the leftmost first inner friction plate 311 of the first friction plate assembly 31 is pressed against the stop structure 8.

It can be understood by those skilled in the art that the drive disc 1 can also be fixed to the bushing 5 by welding, screwing or snap fitting; the first friction plate assembly 31 can also include one, two, three, five or more pairs of first inner friction plates 311 and first outer friction plates 312 that can abut with each other. In addition, the first spring 71 and the second spring 72 may also be provided in other numbers, for example, there may be provided one, four, five or six first springs 71, and one, ten, twelve or fourteen second springs 72. The number of the second springs 72 is larger than the number of the first springs 71, making the force between the pressing unit 4 and the second friction plate assembly 32 more uniform, and reducing the force that a single second spring 72 is subject to, thereby prolonging service life of the second springs 72. Furthermore, the above-described specific structure for enabling the first outer friction plates 312 and the basic outer friction plate 321 to rotate in synchronization with the driven disc 2 and move axially relative to the driven disc 2, and the specific structure for enabling the first inner friction plates 311 to rotate in synchronization with the drive disc 1 and move axially relative to the drive disc 1 merely relate to an embodiment that can be selected. Those skilled in the art can make adjustment as required for adaption to specific application scenes. For example, the inner surface of the cylindrical flange of the driven disc 2 and the outer rings of the first outer friction plates 312 and the basic outer friction plate 321 are each formed with at least one matching groove, and connection of the driven disc 2 and the first outer friction plates 312 and the basic outer friction plate 321 is realized by these two corresponding grooves via a connection key; the outer surface of the flange portion of the outer hub 41 and the inner rings of the first inner friction plates 311 are each formed with at least one matching groove, and connection of the first inner friction plates 311 and the flange portion of the outer hub 41 is realized by these two corresponding grooves via a connection key.

Figure 5:
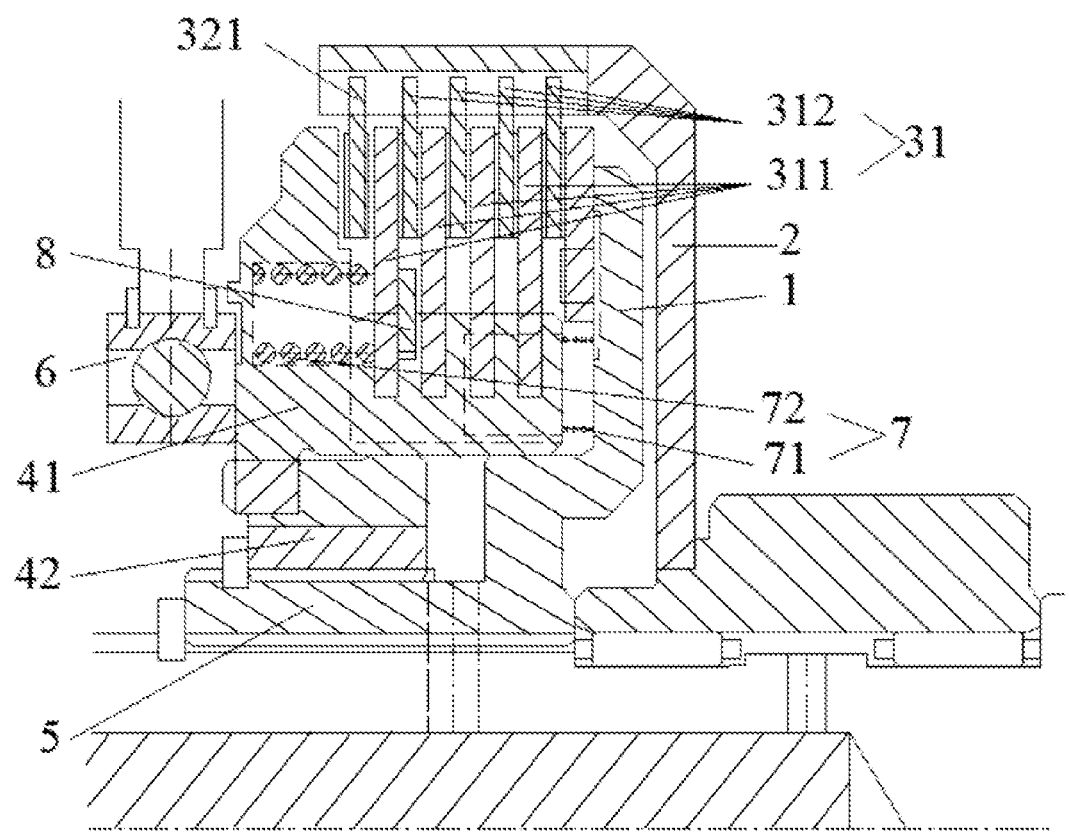
FIG. 5 is a schematic state view of a wet clutch according to an embodiment of the present disclosure when a first friction plate assembly is in an engaged state.
Figure 6:
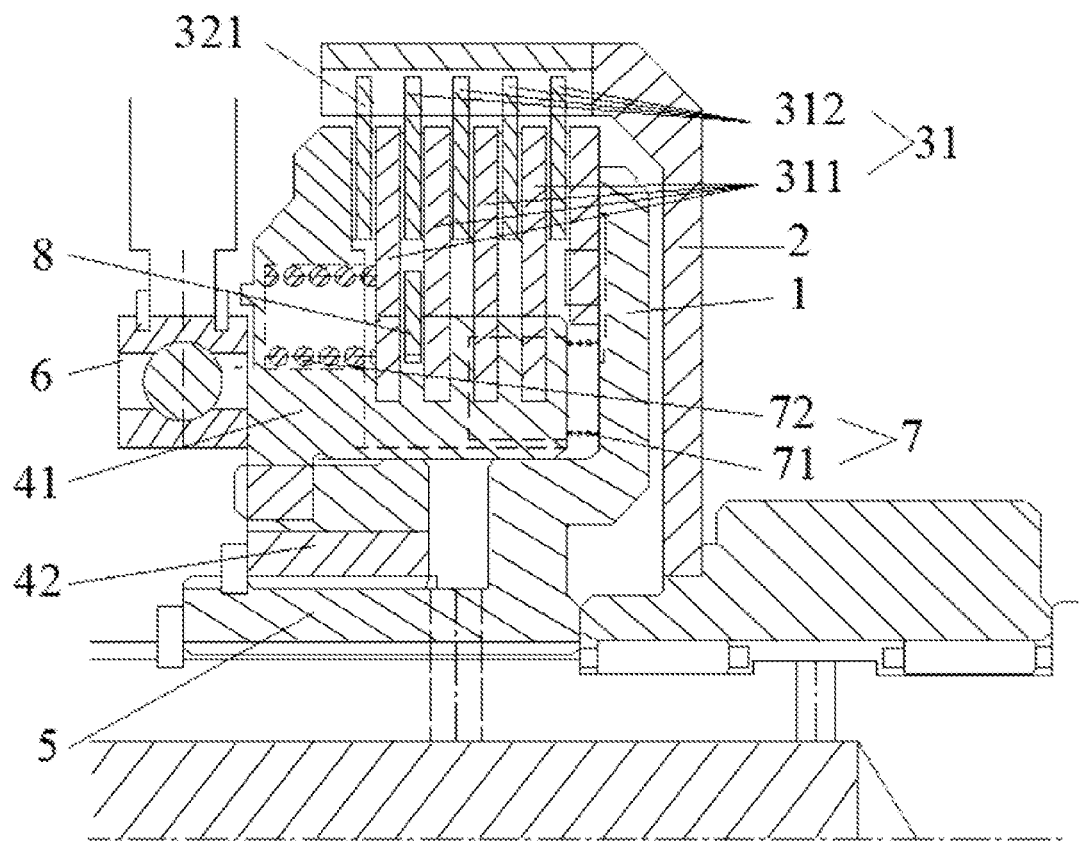
FIG. 6 is a schematic state view of a wet clutch according to an embodiment of the present disclosure when a first friction plate assembly and a second friction plate assembly together are in an engaged state.

Referring to FIGS. 5-6 and still referring to FIG. 4, FIG. 5 is a schematic state view of a wet clutch according to an embodiment of the present disclosure when a first friction plate assembly is in an engaged state, and FIG. 6 is a schematic state view of a wet clutch according to an embodiment of the present disclosure when a first friction plate assembly and a second friction plate assembly together are in an engaged state.

As shown in FIG. 4, when the pressing bearing 6 does not apply a rightward pressure to the outer hub 41, under the action of the first spring 71 and the second spring 72, there is a certain gap between adjacent two of the first inner friction plate 311, the first outer friction plate 312, the basic outer friction plate 321, the outer hub 41 and the drive disc 1, so that the drive disc 1 and the driven disc 2 are in a disengaged state. At this time, a drive shaft drives the bushing 5 to rotate, and the bushing 5 drives the drive plate 1, the first inner friction plate 311 and the outer hub 41 to rotate synchronously, while the driven disc 2, the first outer friction plate 312 and the basic outer friction plate 321 keep stationary.

When the pressing bearing 6 applies a certain pressure to the outer hub 41, the first spring 71 is further compressed, and the outer hub 41 is moved to the right. Since the pre-tightening force of the second spring 72 is greater than the pressing force required for the engagement of the first friction plate assembly 31, during rightward movement of the outer hub 41, the second spring 72 presses the leftmost first inner friction plate 311 of the first friction plate assembly 31 closely against the stop structure 8, and brings the leftmost first inner friction plate 311 of the first friction plate assembly 31 into contact with the first outer friction plate 312 on its right side and pushes the same to the right, finally causing the first inner friction plate 311 and the first outer friction plate 312 of the first friction plate assembly 31 to closely abut with each other, and pressing the rightmost first outer friction plate 312 of the first friction plate assembly 31 closely against the drive disc 1 to achieve the state as shown in FIG. 5. At this point, a certain gap is only maintained between the basic outer friction plate 321 and the leftmost first inner friction plate 311 of the first friction plate assembly 31 and the outer hub 41.

When the pressing bearing 6 applies a greater pressure to the outer hub 41, both the first spring 71 and the second spring 72 are continuously compressed, and the outer hub 41 is moved to the right. The flange portion of the outer hub 41 is firstly abutted against the basic outer friction plate 321 so that the gap between the flange portion of the outer hub 41 and the basic outer friction plate 321 disappears, and then the basic outer friction plate 321 is pushed to continue to move rightward so as to abut the basic outer friction plate 321 against the leftmost first inner friction plate 311 of the first friction plate assembly 31 so that the gap between the basic outer friction plate 321 and the leftmost first inner friction plate 311 of the first friction plate assembly 31 disappears, and the basic outer friction plate 321 is pressed against the outer hub 41 and the leftmost first inner friction plate 311 of the first friction plate assembly 31, respectively, to reach the state as shown in FIG. 6, thereby further increasing the friction area and improving the ability of torque transmission.

In a possible embodiment, the second friction plate assembly 32 further includes at least one pair of second outer friction plate and second inner friction plate that can abut with each other between the basic outer friction plate 321 and the pressing unit. The second outer friction plate can rotate synchronously with the driven disc 2, and the second inner friction plate can rotate in synchronization with the drive disc. When the pressing bearing 6 applies a certain pressure to the outer hub 41, the first spring 71 is further compressed, and the outer hub 41 is moved to the right, so that the leftmost first inner friction plate 311 of the first friction plate assembly 31 comes into contact with the first outer friction plate 312 on its right side and pushes the same to the right, finally causing the first inner friction plate 311 and the first outer friction plate 312 of the first friction plate assembly 31 to closely abut with each other, and pressing the rightmost first outer friction plate 312 of the first friction plate assembly 31 closely against the drive disc 1. When the pressing bearing 6 applies a greater pressure to the outer hub 41, both the first spring 71 and the second spring 72 are continuously compressed, and the outer hub 41 is moved to the right. The flange portion of the outer hub 41 presses a second outer friction plate of the second friction plate assembly 32 that is adjacent to the flange portion such that the second outer friction plate and the second inner friction plate of the second friction plate assembly 32, the basic outer friction plate, and the leftmost first inner friction plate are pressed closely and engaged with each other. With such an arrangement, on the basis that the first inner friction plate 311 and the first outer friction plate 312 of the first friction plate assembly 31 are engaged with each other, the second inner friction plate and the second outer friction plate of the second friction plate assembly 32 are engaged with each other, which can increase a large friction area, thereby greatly improving the ability of torque transmission. It should be noted that the arrangement of the second spring 72 remains unchanged, and the second inner friction plate and/or the second outer friction plate may be provided with an opening or a notch for the second spring 72 to pass through.

With continued reference to FIG. 2, preferably, the pressing unit 4 includes an inner hub 42 connected to the bushing 5, and a docking structure 9 is disposed between the inner hub 42 and the outer hub 41. The docking structure 9 includes a plurality of bosses 91 provided on an outer surface of the inner hub 42 and a plurality of grooves 92 provided on an inner surface of the outer hub 41 for fitting with the bosses 91. The bosses 91 expand from one side close to the second friction plate assembly 32 towards the other side in an axial direction of the bushing 5. That is, the bosses 91 expand from right to left according to the orientation shown in FIG. 4. A slope is formed on both ends of the bosses 91 in a circumferential direction of the inner hub 42, and correspondingly a slope is formed on both ends of the grooves 92 in a circumferential direction of the outer hub 41. When the bushing 5 is rotated to drive the inner hub 42 to rotate, the slope at one end of the boss 91 and the corresponding slope of the groove 92 are closely abutted together. With the slope-fitting structure, the inner hub 42, through the fitting of the bosses 91 and the grooves 92, produces a tangential component force in a rotational direction of the inner hub 42 and an axial component force towards the friction plate unit 3 in the axial direction of the bushing 5 with respect to the outer hub 41 at the joint of the slopes. The tangential component force drives the outer hub 41 to rotate, and the axial component force and the pressing force of the pressing bearing 6 act together to press the first friction plate assembly 31 tightly, or press the first friction plate assembly 31 and the second friction plate assembly 32 tightly together. When the bushing 5 is rotated in a reverse direction, a driving component force and an axial component force are produced by the slopes on the other ends of the boss 91 and the groove 92 that are fitted with each other.

With such an arrangement, the pressing bearing 6 only needs to apply a small pressing force to bring the first friction plate assembly 31 or a combination of the first friction plate assembly 31 and the second friction plate assembly 32 into a semi-engaged state. Under the action of the docking structure 9, the inner hub 42 generates an axial component force towards the friction plate unit 3 in the axial direction of the bushing 5 with respect to the outer hub 41, so that the first friction plate assembly 31 or the combination of the first friction plate assembly 31 and the second friction plate assembly 32 is fully engaged. In this way, engagement of the clutch can be realized by using a drive device having a small drive power such as a drive motor to drive the pressing bearing 6, thereby reducing the stress of the pressing bearing 6 and increasing the service life. It can be understood by those skilled in the art that the boss 91 may be configured such that a slope is formed at only one end in the circumferential direction of the inner hub 42, and correspondingly the groove 92 is formed with a slope at the corresponding end in the circumferential direction of the outer hub 41. Thus, when the drive disc 1 is rotated in only one direction, the inner hub 42, under the action of the docking structure 9, generates an axial component force towards the friction plate unit 3 in the axial direction of the bushing 5 with respect to the outer hub 41.

Figure 7:
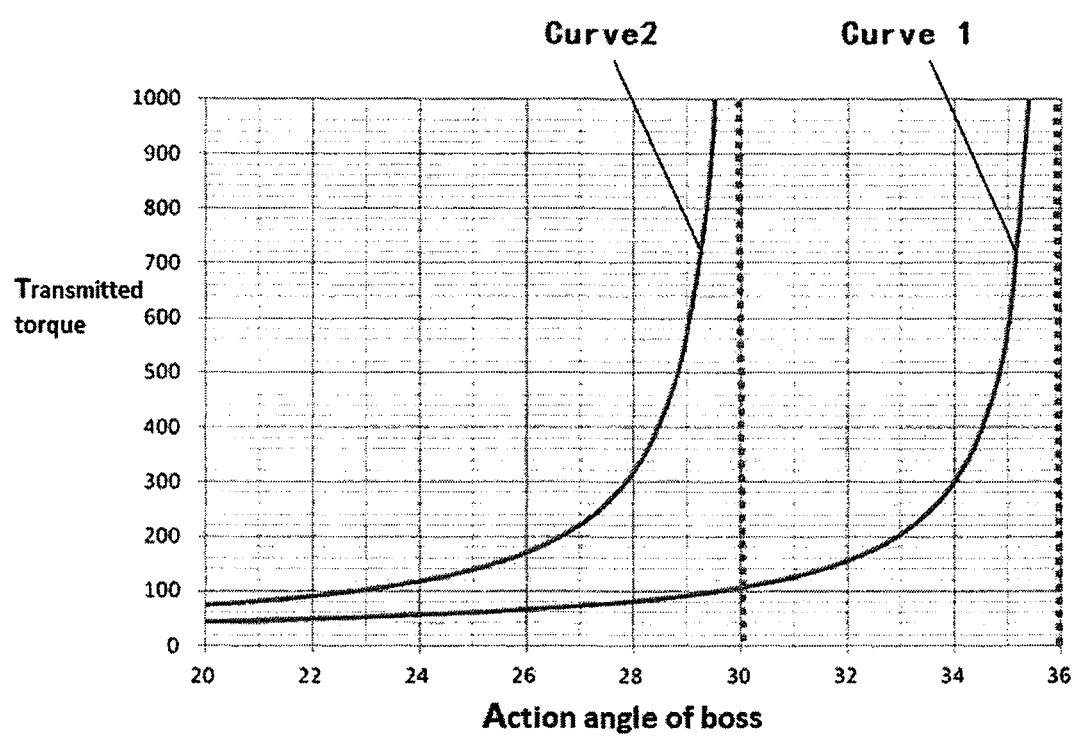
FIG. 7 is a diagram showing relationship between an action angle of a boss and a transmitted torque of a wet clutch according to an embodiment of the present disclosure.

With continued reference to FIG. 7, FIG. 7 is a diagram showing relationship between an action angle of a boss and a transmitted torque of a wet clutch according to an embodiment of the present disclosure. In the case where the docking structure 9 is provided between the inner hub 42 and the outer hub 41 of the wet clutch of the present disclosure, the maximum torque that the wet clutch of the present disclosure can transmit can be calculated by the following formula:

$$T = (2*\mu*r*R*n/(r - 2*\mu*R*n*\tan\theta))*R*P;$$

In the formula, T is the maximum torque that the clutch can transmit; P is the pressing force of the pressing bearing 6, $\mu$ is the friction coefficient, R is the effective radius of the clutch, r is the effective radius of the boss 91, $\theta$ is the action angle of boss, n is the number of engaged outer friction plates (i.e., the total number of the engaged first outer friction plates, basic outer friction plate and second outer friction plates).

It can be seen that, in the case where the parameters $\mu$, R, r, n, P have been determined, the maximum torque T that the wet clutch can transmit is positively correlated with the boss action angle θ, and when $r-2*\mu*R*n*\tan\theta=0$, there is a critical angle of the boss action angle θ. Specifically, only in the state where the first friction plate assembly 31 is engaged, at this point, n=4, the relationship between the maximum torque T that can be transmitted and the boss action angle θ is as shown by the curve 1 in FIG. 7, and the critical angle is 36°; in a state where the first friction plate assembly 31 and the second friction plate assembly 32 are engaged together, that is, when the outer hub 41 presses the basic outer friction plate 321 closely against the first friction plate assembly 31, at this point, n=5, the relationship between the maximum torque T that can be transmitted and the boss action angle θ is as shown by the curve 2 in FIG. 7, and the critical angle is 30°. In the design stage, the boss action angle θ can be set to be any value between the critical angles 30° and 36°, for example, setting the boss action angle θ to be 34°.

In actual use, when the pressure applied by the pressing bearing 6 to the outer hub 41 is smaller than a set value, only the first friction plate assembly 31 is engaged, at this point, the torque that the wet clutch can transmit can be increased as the pressure of the pressing bearing 6 increases, and the maximum torque that can be transmitted is 300 NM. When the pressure of the pressing bearing 6 is greater than a set value, the first friction plate assembly 31 and the second friction plate assembly 32 are engaged together, and at this point, the friction plates of the first friction plate assembly 31 and the second friction plate assembly 32 are mutually meshed and locked, resulting in an infinite maximum torque that can be transmitted, which greatly improves the ability of torque transmission of the wet clutch. When it is required to switch to a state where only the first friction plate assembly 31 is engaged, the pressing bearing 6 is moved to the left, reducing the magnitude of the resultant force that the outer hub 41 is subject to in the axial direction of the bushing 5; and the friction plates and the outer hub 41, under the action of the first spring 71 and the second spring 72, are moved to the left, reducing the pressure against the basic outer friction plate 321, thereby bringing the second friction plate assembly 32 into a disengaged state. When there is need to disengage the wet clutch completely, the pressing bearing 6 continues to be moved to the left to remove the pressure of the pressing bearing 6 against the outer hub 41, and under the action of the first spring 71, the first friction plate assembly 31 is brought into the disengaged state.

It should be noted that the boss action angle θ can be set upon actual conditions to meet requirements of different clutches.

With such an arrangement, different capabilities of torque transmission can be achieved with engagement of different numbers of friction plates; by merely applying a small pressure on the pressing bearing 6, engagement of the first friction plate assembly 31 or achieve engagement of the first friction plate assembly 31 and the second friction plate assembly 32 at the same time can be achieved, and movement of the pressing bearing 6 can be driven merely by a drive device having a small power such as a motor. Compared with the conventional hydraulically driven clutches, the requirements on the drive device are lowered, the structure is simplified, and the manufacture cost is reduced.

It can be understood by those skilled in the art that in the above embodiment, the element marked with "1" in the drawings is a drive disc and the element marked with "2" is a driven disc is only an optional embodiment, which can be adjusted by those skilled in the art as required so as to be adapted to specific application scenes. For example, the element marked with "1" can be a driven disc connected to an output shaft, and the element marked with "2" can be a drive disc connected to an input shaft.

Besides, the present disclosure provides an automobile including the wet clutch according to any one of the aforementioned embodiments. With the wet clutch, the pressing force for driving the pressing bearing 6 is reduced during the gear shifting of the automobile, and under the action of the first spring 71 and the second spring 72, the outer hub 41 is moved to the left to firstly disengage the second friction plate assembly 32 into a non-operational state, and then the first friction plate assembly 31 is brought into a semi-engaged state; at this point, the gear shifting is performed, and after the gear shifting the pressing bearing 6 is pressed to the right, so that the first friction plate assembly 31 gradually reaches a fully engaged state, thereby realizing continuous power transmission in the gear shifting process, reducing the impact and ensuring the driving smoothness and comfort of the automobile. When there is a need to transmit different torques, either of the first friction plate assembly 31 alone and a combination of the first friction plate assembly 31 and the second friction plate assembly 32 can be selected according to the magnitude of the transmitted torque to achieve engagement of the drive disc 1 and the driven disc 2, so as to ensure that the clutch is in the optimal operational state and satisfy requirements of the automobile under different working conditions.

As can be seen from the above description, in the preferred technical solutions of the present disclosure, the clutch includes a drive disc, a driven disc, a bushing fixedly connected or integrally formed with the drive disc, and a friction plate unit capable of engaging or disengaging the drive disc with or from the driven disc, the friction plate unit including a first friction plate assembly and a second friction plate assembly. The clutch further includes a pressing unit including an outer hub and an inner hub that are movable in an axial direction of the bushing and rotate synchronously with the bushing. A docking structure is provided between the outer hub and the inner hub, and the docking structure includes a plurality of bosses provided on an outer surface of the inner hub and grooves provided on an inner surface of the outer hub for fitting with the bosses, wherein the bosses expand from one side adjacent to the second friction plate assembly to the other side in an axial direction of the bushing. A spring assembly is provided on the outer hub. The first friction plate assembly includes at least one pair of first outer friction plate and first inner friction plate that are capable of abutting with each other, wherein the first outer friction plate is rotatable in synchronization with the driven disc, and the first inner friction plate is rotatable in synchronization with the drive disc. The second friction plate assembly includes a basic outer friction plate that can abut with a first inner friction plate of the first friction plate assembly that is adjacent to the side of the second friction plate assembly, and the basic outer friction plate is rotatable synchronously with the driven plate. The pressing unit is configured to engage or disengage the drive disc with or from the driven disc selectively by the first friction plate assembly alone or by a combination of the first friction plate assembly and the second friction plate assembly.

With such an arrangement, it is possible to make a selection according to magnitude of the transmitted torque to determine whether to use the first friction plate assembly alone to engage the drive disc with the driven disc or to use a combination of the first friction plate assembly and the second friction plate assembly to engage or disengage the drive disc with or from the driven disc, so that an appropriate number of friction plates can be selected as required to realize engagement of the clutch, thereby reducing friction losses of the clutch, prolonging service life and improving comprehensive performance of the clutch. With the docking structure, an axial action force between the inner hub and the outer hub can be produced while the torque is transmitted therebetween, thereby reducing the pressing force applied by the drive device to the drive unit in the process of engagement of the clutch and therefore reducing requirements on the drive device.

The aforementioned embodiments are merely illustrative of the embodiments of the present disclosure, which shall not be construed as limiting the scope of the present disclosure although they are described concretely and specifically. It should be noted that numerous variations and modifications can be made by those skilled in the art without departing from the concept of the present disclosure, which all fall within the scope of protection of the present disclosure. Therefore, the scope of protection of the present disclosure should be determined by the appended claims.

What is claimed is:

1. A clutch, comprising a drive disc, a driven disc, and a friction plate unit capable of engaging or disengaging the drive disc with or from the driven disc, the friction plate unit comprising a first friction plate assembly and a second friction plate assembly, wherein the clutch further comprises a pressing unit configured to engage or disengage the drive disc with or from the driven disc selectively by the first friction plate assembly alone or by a combination of the first friction plate assembly and the second friction plate assembly;

the first friction plate assembly comprises at least one pair of first outer friction plate and first inner friction plate that are capable of abutting with each other, and wherein the first outer friction plate is rotatable in synchronization with the driven disc, and the first inner friction plate is rotatable in synchronization with the drive disc;

the second friction plate assembly comprises a basic outer friction plate that can abut with a first inner friction plate of the first friction plate assembly that is adjacent to the side of the second friction plate assembly, the basic outer friction plate being rotatable in synchronization with the driven disc;

the second friction plate assembly further comprises at least one pair of second outer friction plate and second inner friction plate that can abut with each other between the basic outer friction plate and the pressing unit, the second outer friction plate being rotatable in synchronization with the driven disc, and the second inner friction plate being rotatable in synchronization with the drive disc, the spring assembly comprises a first spring and a second spring, the outer hub comprises a flange portion and a boss portion, the first spring is disposed between the boss portion and the drive disc, the first inner friction plate is sleeved over the boss portion, the boss portion is provided with a stop structure disposed on a side of the first inner friction plate closely adjacent to the basic friction plate that is opposite to the basic friction plate, and the second spring is disposed between the flange portion and the first inner friction plate closely adjacent to the basic friction plate to abut the first inner friction plate closely adjacent to the basic friction plate against the stop structure, the first spring is further compressed as the outer hub moves closer to the first friction plate assembly to engage the first outer friction plate with the first inner friction plate, and a pre-tightening force of the second spring is greater than a pressing force required for engaging the first outer friction plate with the first inner friction plate of the first friction plate assembly, so that based on the engagement of the first outer friction plate and the first inner friction plate, the second spring is further compressed when the outer hub continues to move closer to the first friction plate assembly to cause the flange portion to press the basic friction plate to thereby engage the basic outer friction plate with the first inner friction plate closely adjacent to the basic friction plate.

2. The clutch according to claim 1, wherein the first friction plate assembly comprises at least one pair of first outer friction plate and first inner friction plate that are capable of abutting with each other, and wherein the first outer friction plate is rotatable in synchronization with the drive disc, and the first inner friction plate is rotatable in synchronization with the driven disc.

3. The clutch according to claim 1, wherein the clutch comprises a bushing fixedly connected or integrally formed with the drive disc, and the pressing unit comprises an outer hub movable in an axial direction of the bushing and synchronously rotatable with the bushing, and a spring assembly provided on the outer hub, wherein the outer hub is movable in a direction toward the first friction plate assembly in the axial direction of the bushing to engage the first outer friction plate with the first inner friction plate of the first friction plate assembly by pressing the spring assembly; and based on the engagement of the first outer friction plate with the first inner friction plate of the first friction plate assembly, the outer hub can continue to move in a direction toward the first friction plate assembly in the axial direction of the bushing to engage the basic outer friction plate of the second friction plate assembly with the first friction plate assembly by pressing the spring assembly.

4. The clutch according to claim 3, wherein the spring assembly comprises pre-compressed first spring and second spring, the outer hub comprises a flange portion and a boss portion, the first spring is disposed between the boss portion and the drive disc, the first inner friction plate is sleeved over the boss portion, the boss portion is provided with a stop structure disposed on a side of the first inner friction plate closely adjacent to the basic friction plate that is opposite to the basic friction plate, and the second spring is disposed between the flange portion and the first inner friction plate closely adjacent to the basic friction plate to abut the first inner friction plate closely adjacent to the basic friction plate against the stop structure, wherein the first spring is further compressed as the outer hub moves closer to the first friction plate assembly to engage the first outer friction plate with the first inner friction plate, and a pre-tightening force of the second spring is greater than a pressing force required for engaging the first outer friction plate with the first inner friction plate of the first friction plate assembly, so that based on the engagement of the first outer friction plate and the first inner friction plate, the second spring is further compressed when the outer hub continues to move closer to the first friction plate assembly to cause the flange portion to press the second friction plate assembly to thereby engage the basic outer friction plate with the first inner friction plate closely adjacent to the basic friction plate.

5. The clutch according to claim 1, wherein the spring assembly comprises a plurality of first springs and a plurality of second springs, the plurality of first springs and the plurality of second springs each being disposed in a circumferential direction of the outer hub.

6. The clutch according to claim 1, wherein the pressing unit further comprises an inner hub connected to the bushing, and a docking structure is provided between the inner hub and the outer hub, the docking structure comprising a plurality of bosses provided on an outer surface of the inner hub and a plurality of grooves provided on an inner surface of the outer hub for fitting with the bosses.

7. The clutch according to claim 6, wherein each of the bosses expands from a side adjacent to the second friction plate assembly to the other side in an axial direction of the bushing.

8. An automobile, comprising the clutch according to claim 1.

* * * * *